US009660277B2

(12) United States Patent
Yang et al.

(10) Patent No.: US 9,660,277 B2
(45) Date of Patent: May 23, 2017

(54) METHODS FOR INHIBITING CORROSION IN BRAZED METAL SURFACES AND COOLANTS AND ADDITIVES FOR USE THEREIN

(75) Inventors: Bo Yang, Ridgefield, CT (US); Peter M. Woyciesjes, Woodbury, CT (US); Aleksei V. Gershun, Southbury, CT (US); Filipe J. Marinho, Danbury, CT (US)

(73) Assignee: Prestone Products Corporation, Danbury, CT (US)

( * ) Notice: Subject to any disclaimer, the term of this patent is extended or adjusted under 35 U.S.C. 154(b) by 0 days.

(21) Appl. No.: 13/551,329

(22) Filed: Jul. 17, 2012

(65) Prior Publication Data

US 2012/0288404 A1    Nov. 15, 2012

Related U.S. Application Data

(60) Continuation of application No. 12/758,314, filed on Apr. 12, 2010, now abandoned, which is a division of
(Continued)

(51) Int. Cl.
| | |
|---|---|
| *C09K 5/00* | (2006.01) |
| *H01M 8/04029* | (2016.01) |
| *C09K 5/20* | (2006.01) |
| *C09K 5/08* | (2006.01) |
| *C09K 5/10* | (2006.01) |
| *C23F 11/12* | (2006.01) |
| *C23F 11/173* | (2006.01) |
| *H02K 9/19* | (2006.01) |

(52) U.S. Cl.
CPC .......... *H01M 8/04029* (2013.01); *C09K 5/08* (2013.01); *C09K 5/10* (2013.01); *C09K 5/20* (2013.01); *C23F 11/124* (2013.01); *C23F 11/173* (2013.01); *H01M 2250/20* (2013.01); *H02K 9/19* (2013.01); *Y02T 90/32* (2013.01)

(58) Field of Classification Search
CPC ... C09K 5/00; C09K 5/08; C09K 5/10; C09K 5/20
USPC .......... 422/7, 12, 13, 22, 23, 38; 165/51, 61, 165/66, 64, 48.1, 42; 252/73, 75, 77, 8, 252/396, 400.62, 407; 106/14.05, 14.13, 106/14.22, 14.24, 18
See application file for complete search history.

(56) References Cited

U.S. PATENT DOCUMENTS

| 3,198,820 A | 8/1965 | Pines et al. |
| 3,203,969 A | 8/1965 | Pines et al. |

(Continued)

FOREIGN PATENT DOCUMENTS

| EP | 0245557 | 11/1987 |
| EP | 0381656 | 8/1990 |

(Continued)

OTHER PUBLICATIONS

International Search Report, dated Oct. 31, 2006 for PCT/2006/024741, International filing date Jun. 26, 2006.
(Continued)

*Primary Examiner* — Jane L Stanley
(74) *Attorney, Agent, or Firm* — Gregory H. Zayia; Barnes & Thornburg LLP (57) ABSTRACT

Disclosed are coolants comprising brazed metal corrosion inhibitors.

17 Claims, 1 Drawing Sheet

Related U.S. Application Data application No. 11/474,726, filed on Jun. 26, 2006, now Pat. No. 8,066,902.

(60) Provisional application No. 60/693,984, filed on Jun. 24, 2005.

(56) References Cited

U.S. PATENT DOCUMENTS

| | | | |
|---|---|---|---|
| 3,248,329 | A | 4/1966 | Pines et al. |
| 3,312,622 | A | 4/1967 | Pines et al. |
| 3,337,496 | A | 8/1967 | Pines et al. |
| 3,341,469 | A | 9/1967 | Pines et al. |
| 3,931,029 | A | 1/1976 | Dutton et al. |
| 3,981,682 | A | 9/1976 | Ward et al. |
| 4,093,641 | A | 6/1978 | Plueddemann |
| 4,287,077 | A | 9/1981 | Wing |
| 4,333,843 | A | 6/1982 | Wing et al. |
| 4,352,742 | A | 10/1982 | Davis et al. |
| 4,354,002 | A | 10/1982 | Davis et al. |
| 4,362,644 | A | 12/1982 | Davis et al. |
| 4,370,255 | A | 1/1983 | Plueddemann |
| 4,392,972 | A | 7/1983 | Mohr et al. |
| 4,404,114 | A | 9/1983 | Mohr et al. |
| 4,517,110 | A | 5/1985 | Suzuki et al. |
| 4,614,600 | A | 9/1986 | Schilling et al. |
| 4,629,602 | A | 12/1986 | Gousetis et al. |
| 4,701,277 | A | 10/1987 | Mohr et al. |
| 4,772,408 | A | 9/1988 | Mohr et al. |
| 4,956,106 | A | 9/1990 | Woodward et al. |
| 5,018,577 | A | 5/1991 | Pardue et al. |
| 5,085,791 | A * | 2/1992 | Burns .............. C23F 11/08 252/396 |
| 5,085,793 | A * | 2/1992 | Burns .............. C23F 11/10 252/396 |
| 5,242,621 | A | 9/1993 | Miller et al. |
| 5,292,480 | A * | 3/1994 | Fischer et al. .............. 422/12 |
| 5,338,477 | A | 8/1994 | Chen et al. |
| 5,606,105 | A | 2/1997 | Davis et al. |
| 5,704,961 | A | 1/1998 | Hudson |
| 5,741,436 | A | 4/1998 | Gershun et al. |
| 5,866,042 | A | 2/1999 | Chen |
| 5,925,173 | A * | 7/1999 | Frost .............. C09K 5/20 106/14.13 |
| 6,080,331 | A | 6/2000 | Meszaros et al. |
| 6,126,852 | A | 10/2000 | Turcotte et al. |
| 6,143,243 | A * | 11/2000 | Gershun .............. C09K 5/20 252/76 |
| 6,235,217 | B1 | 5/2001 | Turcotte et al. |
| 6,391,257 | B1 * | 5/2002 | Woyciesjes .............. 422/17 |
| 6,572,789 | B1 | 6/2003 | Yang et al. |
| 7,608,198 | B2 | 10/2009 | Jeffcoate |
| 7,645,331 | B2 | 1/2010 | Yang |
| 7,662,304 | B2 | 2/2010 | Woyciesjes |
| 7,820,066 | B2 | 10/2010 | Jeffcoate |
| 7,854,253 | B2 | 12/2010 | Woyciesjes |
| 7,985,349 | B2 | 7/2011 | Yang |
| 8,216,383 | B2 | 7/2012 | Yang |
| 8,658,326 | B2 * | 2/2014 | Marinho .............. C09K 5/10 136/246 |
| 2002/0076591 | A1 | 6/2002 | Imaseki et al. |
| 2004/0227124 | A1 | 11/2004 | Turcotte et al. |
| 2006/0010872 | A1 | 1/2006 | Singh et al. |
| 2006/0017044 | A1 | 1/2006 | Zhang et al. |
| 2006/0131544 | A1 * | 6/2006 | Scholer .............. C09K 5/20 252/387 |
| 2007/0034825 | A1 | 2/2007 | Wenderoth |
| 2008/0017827 | A1 * | 1/2008 | Ito .............. C09K 5/10 252/68 |
| 2009/0266519 | A1 | 10/2009 | Marinho |
| 2009/0294102 | A1 | 12/2009 | Yang |
| 2010/0006796 | A1 | 1/2010 | Yang |
| 2010/0059703 | A1 | 3/2010 | Yang et al. |
| 2010/0116473 | A1 | 5/2010 | Yang et al. |
| 2014/0119982 | A1 * | 5/2014 | Yang .............. C23F 11/08 422/7 |
| 2014/0119983 | A1 * | 5/2014 | Yang .............. C09K 5/10 422/7 |
| 2014/0223930 | A1 * | 8/2014 | Park .............. C09K 5/20 62/77 |
| 2014/0224193 | A1 * | 8/2014 | Dietl .............. C09K 5/20 123/41.42 |
| 2016/0017200 | A1 * | 1/2016 | Yang .............. C09K 5/20 422/7 |

FOREIGN PATENT DOCUMENTS

| | | |
|---|---|---|
| EP | 0936024 | 8/1999 |
| EP | 1262535 | 12/2002 |
| EP | 1416563 | 5/2004 |
| JP | 1212779 | 8/1989 |
| JP | 6234817 | 8/1994 |
| JP | 7310162 | 11/1995 |
| JP | 2001164224 | 6/2001 |
| JP | 2001167778 | 6/2001 |
| JP | 2004233011 | 8/2004 |
| KR | 1990-0000152 | 1/1990 |
| WO | WO 00/11102 | 2/2000 |
| WO | WO 2006014609 | 2/2006 |
| WO | 2006029372 | 3/2006 |
| WO | WO 2006029326 | 3/2006 |
| WO | WO 2006135414 | 12/2006 |
| WO | WO 2007050568 | 5/2007 |
| WO | WO 2009111443 | 9/2009 |
| WO | WO 2010006256 | 1/2010 |
| WO | WO 2010054224 | 5/2010 |

OTHER PUBLICATIONS

IUPAC Gold Book "acid anhydrides", source: PAC, 1995, 67, 1307 p. 1311.
Written Opinion of the International Searching Authority dated Oct. 31, 2006 for PCT/US2006/024741, International filing date Jun. 26, 2006.
EIC STIC U.S. Appl. No. 11/474,726; 11474726-280021-EICsearch.pdf.
Japanese Patent No. 01212779; Publication Date: Aug. 25, 1989; Abstract Only; 1 Page.
Japanese Patent No. 02021572; Publication Date: Jan. 24, 1990; Abstract Only; 1 Page.
Japanese Patent No. 06234817; Publication Date: Aug. 23, 1994; Abstract Only; 1 Page.
Japanese Patent No. 07310162; Publication Date: Nov. 28, 1995; Abstract Only; 1 Page.
Japanese Patent No. 2001164244; Publication Date: Jun. 19, 2001 ; Abstract Only; 1 Page.
Japanese Patent No. 2001-167778; Publication Date: Jun. 22, 2001 ; Abstract Only; 1 Page.
Japanese Patent No. 2004233011; Publication Date: Aug. 19, 2004; Abstract Only; 1 Page.
Japanese Patent No. 5001940; Publication Date: Jan. 8, 1993; Abstract Only; 1 Page.
European Search Report from EP Appl. 06773971.4 dated Mar. 13, 2014.
International Search Report and Written Opinion of PCT/US2013/56267 dated Sep. 13, 2013.
International Search Report and Written Opinion of PCT/US2013/56262 dated Oct. 16, 2013.
International Search Report and Written Opinion of PCT/US2013/56268 dated Sep. 19, 2013.
Gershun, A.V. and P.M. Woyciesjes, "Engine Coolants and Coolant System Corrosion," *ASM Handbook vol. 13C, Corrosion: Environments and Industries*, p. 531-537 (2006).
Malcolm A. Kelland, "Corrosion Control During Production," Production Chemical for the Oil and Gas Industry ($2^{nd}$ Ed.), Chapter 8, p. 195-223 (Mar. 13, 2004).

(56) References Cited

OTHER PUBLICATIONS

Danila Shutemov, "Modeling and Management of Scale Potential in an Oil Production Network" Dissertation from Norwegian University of Science and Technology—Trondheim (May 2013).

* cited by examiner

METHODS FOR INHIBITING CORROSION IN BRAZED METAL SURFACES AND COOLANTS AND ADDITIVES FOR USE THEREIN

CROSS REFERENCE TO RELATED APPLICATIONS

This application is a continuation of U.S. patent application Ser. No. 12/758,314 filed on Apr. 12, 2010, now abandoned which is a divisional application of U.S. patent application Ser. No. 11/474,726, now U.S. Pat. No. 8,066,902, filed on Jun. 26, 2006. U.S. patent application Ser. No. 11/474,726 claims the benefit of U.S. Provisional Application No. 60/693,984, filed on Jun. 24, 2005, the entire disclosures of which are hereby incorporated by reference.

FIELD OF THE INVENTION

The invention relates to methods for inhibiting corrosion in applications employing brazed metal surfaces as well as to coolants and additives for use in the disclosed methods.

BACKGROUND OF THE INVENTION

Transportation vehicles in use today are often powered by internal combustion engines (ICE) using either gasoline or diesel fuel. Due to the need to increase energy efficiency, reduce pollution and lessen petroleum dependence, vehicles using more advanced propulsion technologies are being developed. Of particular interest are alternatives to traditional ICEs such as electric motors, fuel cells and combinations thereof.

For example, hybrid electric vehicles use both ICEs and electric motors in the propulsion system. The ICE in a hybrid electric vehicle, as in any ICE-powered car, produces power through continuous, controlled explosions that push down pistons connected to a rotating crankshaft. That rotating force (torque) is ultimately transmitted to a vehicle's wheels.

The electric motor in a hybrid electric vehicle is energized by a battery. The battery is continuously recharged by a generator that—like the alternator of a conventional car—is driven by the ICE. In conventional ICE vehicles, energy from deceleration is wasted as it dissipates. In some hybrid vehicles, regenerative braking systems capture that energy, store it, and convert it to electricity to help propel the vehicle—hence increasing energy efficiency. Some hybrid vehicles use ultracapacitors to extend the life of the on-board battery system via the capture of power from regenerative braking and its release for initial acceleration.

Fuel cells are a clean and efficient power source. The fuel cells proposed for use in transportation vehicles produce electricity through electrochemical reaction between hydrogen and oxygen. In fuel cell powered vehicles, hydrogen may be stored as a pressurized gas in onboard fuel tanks. The electricity produced by the fuel cell charges a storage battery (similar to those employed in some hybrid electric vehicles) that energizes the vehicle's electric motor. Thus, a fuel cell vehicle may also be considered as a type of hybrid vehicle.

Despite the differences between traditional ICE powered vehicles and those powered by the various alternative power systems, i.e., electric, fuel cell and combinations thereof, most transportation vehicles require the management and control of excess thermal energy. That is, most transportation vehicles regardless of power source require a cooling system designed to shift or transfer undesirable accumulations of thermal energy or heat.

In most cooling systems, regardless of power source, a coolant is used to the heat from the ICEs, electric motors, fuel cell stacks, and/or other heat generating components in a vehicle. The coolant is then forced to flow through a heat exchanger (e.g., a radiator) to be cooled down by air. The cooled coolant flows back to the coolant tank where it can be pumped back to the heat sources of the vehicle to again remove excess or undesirable heat.

In order to maximize the amount of surface area available for transferring heat between the coolant and the environment, the heat exchanger may be of a tube-and-fin type containing a number of tubes that thermally communicate with high surface area fins. The fins enhance the ability of the heat exchanger to transfer heat from the coolant to the environment.

However, such traditional heat exchanger configurations require significant metal mass. High weight vehicle components are now undesirable in view of environmental standards that require improved fuel economy (mile/gal) and reduced emissions. According, it is now desirable for heat exchangers to be constructed entirely or predominately of lower weight metals, especially aluminum or aluminum alloys.

Several methods have been employed in the manufacture of heat exchangers for use in transportation vehicles.

In the past, mechanical expansion techniques have been used for mass-production of radiators. Mechanical expansion techniques rely solely on the mechanical joining of the heat exchanger components to ensure their integrity. Advantages of these methods include good mechanical strength and avoidance of joining operations that require the use of a furnace operating at high temperature. The disadvantages of these methods include inferior thermal performance and a relatively high final weight for the finished heat exchanger.

To overcome the disadvantages of the mechanical expansion-type heat exchangers, heat exchangers have been increasingly formed by a brazing operation, wherein the individual components are permanently joined together with a brazing alloy. Generally, brazed heat exchangers are lower in weight and are able to radiate heat better than heat exchangers formed by mechanical expansion.

Brazing operations used in heat exchanger manufacturing have traditionally occurring in vacuum furnaces. More recently, a brazing technique known as "controlled atmosphere brazing (CAB)" has become accepted by the automotive industry for making brazing aluminum heat exchangers. Illustrative examples of CAB brazed aluminum heat exchangers as that term is used herein include radiators, condensers, evaporators, heater cores, air charged coolers and inter-coolers.

CAB brazing is preferred over vacuum furnace brazing due to improved production yields, lower furnace maintenance requirements, greater braze process robustness and lower capital cost of the equipment employed.

However, in a CAB process, a fluxing or flux agent is applied to the pre-assembled component surfaces to be jointed. The fluxing agent is used to dissociate or dissolve and displace the aluminum oxide layer that naturally forms on aluminum alloy surfaces. The fluxing agent is also used to prevent reformation of the aluminum oxide layer during brazing and to enhance the flow of the brazing alloy. Illustrative fluxing agents include alkaline metal or alkaline earth metal fluorides or chlorides.

One widely used flux for brazing aluminum is sold under the trademark Nocolok®, which appears to be a mixture of $K_3AlF_6$, $K_2AlF_5$ and $KAlF_4$. (see e.g., U.S. Pat. No. 3,951,328 and U.S. Pat. No. 3,971,501). Fluoride-based fluxes are generally preferred over chloride based fluxes for brazing aluminum or aluminum alloys because they are inert or non-corrosive as aluminum and its alloys but are substantially water insoluble after brazing. In fact, due to its non-corrosive nature and tolerance to brazing assembly fit-up and flexible control, Nocolok® flux brazing is a particularly advantageous method of joining of aluminum heat exchangers. It is now commonly used by the automotive industry in the manufacture of aluminum and aluminum alloy heat exchangers.

Unfortunately, it has been found that residual brazing flux remaining on an aluminum or aluminum alloy surface will leach out fluoride ions. It is believed that the leached fluoride ions can lead to localized corrosion on the metal substrate when it is immersed in the coolant of a cooling system. This undesirable localized corrosion resulting from residual flux has been found to occur in a number of currently available commercial coolants, including those containing organic acid based (or extended life) or hybrid-based (i.e., containing a smaller amount of silicate than traditional silicate based coolants and also one or more organic acids) corrosion inhibitors.

Moreover, the coolants employed in fuel cell powered vehicles have special requirements. For example, coolants are required to cool both the fuel cell stack and the "balance of the plant" systems, such as air compressors, electric motors, DC to AC converter, and other systems. However, the coolant used to cool the fuel cell stack must have a very low electrical conductivity, (e.g., less than 5 μS/cm) in order to minimize electrical shock hazard, corrosion and efficiency reduction.

A fuel cell assembly typically includes an anode (a negatively charged electrode where the oxidation reaction of a fuel, e.g., hydrogen, takes place), a cathode (a positively charged electrode where the reduction reaction of an oxidant, e.g., oxygen, takes place), and an electrolyte in between the two electrodes. To produce sufficient power for use as a vehicle engine, a fuel cell based engine needs to have many cells connected in series together to form a fuel cell stack. Each single cell will typically operate at a voltage of 0.6-1.0V DC. The proposed fuel cell stack for use in vehicles often has more than 100 cells connected in series. Hence, the DC electrical voltage across the fuel cell stack can be very high. The typical reported cell voltage in an automotive fuel cell stacks generally ranges from 125-450V DC.

In addition to generating significant electric power, a fuel cell assembly also generates substantial heat due to the exothermic nature of the electrochemical reactions involved and the flow of electrical current.

Thus, a fuel cell stack also contains coolant channels for the circulation of coolant to remove heat from the stack. In circulating a coolant through the coolant channels, the temperature of the fuel cell stack may be controlled at the desirable range for optimal operating conditions. The cooling system surrounding the fuel cell stack, however, is exposed to the same electrical voltage as the fuel cell stack itself. To prevent or minimize electrical shock hazard, the coolant must have very low conductivity. For example, the upper limits for coolant conductivity may be set to less than 5 μS/cm (e.g., U.S. Pat. No. 5,776,624). Low electrical conductivity for fuel cell coolant is also desirable for the reduction of shunt current in the coolant system and the minimization of system efficiency reduction.

Higher concentrations of fluoride ions in a fuel cell coolant from residual brazing flux produce an increase in the electrical conductivity of the fuel cell coolant. Thus, the interaction of residual brazing flux and coolant is particularly undesirable in a CAB brazed fuel cell heat exchanger, not withstanding the localized corrosion issues present in any CAB brazed heat exchanger.

Accordingly, the widespread use of CAB processes in heat exchanger manufacturing has led to concerns about: (1) localized corrosion of brazed aluminum surfaces due to the interaction of brazing fluxes and currently available coolants and (2) the effects of residual brazing fluxes upon the electrical conductivity of coolants currently used in aluminum based fuel cell heat exchangers, i.e., undesirable increases in electrical conductivity. These issues are of particular concern with regard to fluoride based brazing fluxes.

SUMMARY OF THE INVENTION

Disclosed are coolants comprising brazed metal corrosion inhibitors. In one embodiment, the disclosed brazed metal corrosion inhibitor will comprise a polycarboxylic acid functional compound having the structure:

wherein $R^1$, $R^2$, $R^3$, and $R^4$ are each independently selected from the group consisting of H, OH, COOH, $C_1$-$C_{10}$ alkyl groups, glycol esters, anhydride groups, —COOM, and combinations thereof, wherein M is at least one of H, alkali metal ions, alkali earth metal ions, $NH_4^+$, amines, imidazoline, polyalcohol esters, C1 to C12 alkyl groups, and combinations thereof; wherein (1) at least three of $R^1$, $R^2$, $R^3$, and $R^4$ contain the group —COOM, wherein M is defined above; or (2) at least two of $R^1$, $R^2$, $R^3$, and $R^4$ contain an anhydride group, and at least one of $R^1$, $R^2$, $R^3$, and $R^4$ contain the group —COOM, wherein M is defined above.

Also disclosed is a method for inhibiting corrosion in a brazed metal surface in communication with a coolant. In one embodiment, the method comprises contacting a brazed metal surface with a coolant comprising a brazed metal corrosion inhibitor. In one embodiment, the brazed metal corrosion inhibitor comprises a polycarboxylic acid functional compound comprising, on average per molecule, at least three groups selected from the group consisting of anhydride groups, —COOM, and combinations thereof, wherein M is at least one of H, alkali metal ions alkali earth metal ions, NH4+ amines, imidazoline, polyalcohol esters, C1 to C12 alkyl groups, and combinations thereof.

In another embodiment, a cooling system resistant to corrosion is disclosed, the cooling system comprising at least one cooling system component comprising a brazed metal surface and a coolant in communication with the brazed metal surface, said coolant comprising an acid functional corrosion inhibiting component comprising a brazed metal corrosion inhibitor. In one embodiment, the brazed metal surface comprises residual fluxing agent.

Finally, another embodiment of a cooling system resistant to corrosion is disclosed. In this embodiment, the cooling system comprises a first cooling subsystem comprising at least one cooling system component comprising a brazed metal surface, a first coolant in communication with the brazed metal surface, said first coolant comprising an acid functional corrosion inhibiting component comprising a brazed metal corrosion inhibitor, a second cooling subsystem, and a second coolant in communication with the second cooling system, wherein the second coolant does not contact the first cooling subsystem, and wherein the second coolant does not contact a brazed aluminum surface.

DESCRIPTION OF THE FIGURE

The FIGURE displays a graph illustrating the effect of various coolant formulations on brazed aluminum surface corrosion.

DETAILED DESCRIPTION OF THE PREFERRED EMBODIMENTS

Figure 1:
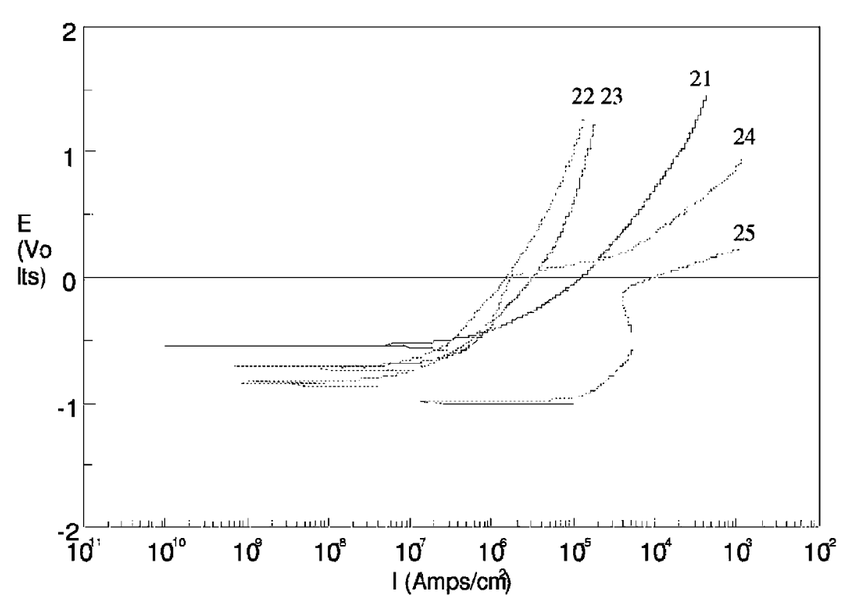

Disclosed are corrosion inhibitors for brazed metal surfaces, especially brazed aluminum surfaces that will hereinafter be referred to as, i.e., brazed metal corrosion inhibitors, and coolants comprising the same.

In one embodiment, the disclosed brazed metal corrosion inhibitors comprise polycarboxylic acid functional compounds.

In another embodiment, the instant invention proposes to use compounds containing 3 or more carboxylate groups and a hydrophobic group such as hydrocarbon chain containing between 4 to 18 carbon atoms as the brazed metal corrosion inhibitors.

Alternatively, such brazed metal corrosion inhibitors may be described as comprising polycarboxylic acid functional compounds comprising, on average per molecule, at least three groups selected from the group consisting of anhydride groups, —COOM, and combinations thereof, wherein M is at least one of H, alkali metal ions, alkali earth metal ions, metal hydroxides, NH4+, amines, imidazoline, polyalcohol esters, C1 to C12 alkyl groups, and combinations thereof.

In another embodiment, the instant invention proposes to use one of the tall oil fatty acid derived chemicals as a corrosion inhibitor for brazed metal surfaces.

In one embodiment, suitable brazed metal corrosion inhibitors are those tall oil fatty acid derived compounds that include various cyclohexenoic acid containing compounds as described in U.S. Pat. No. 5,292,480 and U.S. Pat. No. 6,391,257B1, the contents of which are incorporated by reference hereto.

Specifically, suitable brazed metal corrosion inhibitors include the following, (1) maleated tall oil fatty adds and their salts (i.e., TENAX® 2010 is a commercially available example); (2) reaction products of maleated tall oil fatty acids, diethylene glycol ester and their salts (e.g., TENAX® WS-5520 and WS-5560 are commercially available examples); (3) reaction products of maleated tall oil fatty acids, ethylene glycol ester and their salts (e.g., OCD 447 or WS-3520 are commercially available examples); (4) maleated tall oil (e.g., TENAX® 2015 are commercially available examples). In addition, maleinized unsaturated fatty acids and certain copolymers of acrylate and styrene (such as Alcosperse 725) can also be used as suitable examples of the disclosed brazed aluminum corrosion inhibitors. Also suitable as the disclosed brazed metal corrosion inhibitors are carboxylate based polymers containing suitable hydrophobic portions or polymerizable-acid graft polymer, such as EPML-483 polymer and the like. Finally, it will be appreciated that mixtures containing one or more these illustrative examples are likewise suitable for use as the disclosed brazed metal corrosion inhibitors.

It will be appreciate that the disclosed brazed metal corrosion inhibitors need not be the sole corrosion inhibitors. In one exemplary embodiment, such brazed metal corrosion inhibitors will be present in combination with other corrosion inhibitors. In one embodiment, such other corrosion inhibitors may be acid functional but will be other than those compounds disclosed to be brazed metal corrosion inhibitors as that term is used herein. The term "acid functional corrosion inhibiting component" thus refers to any component other than a brazed metal corrosion inhibitor that provides a corrosion inhibiting effect and comprises an acid group or a derivative thereof, such as an anhydride, ester, or the like. In another embodiment, 'acid functional corrosion inhibiting component' refers to any corrosion inhibitor other than those defined herein as brazed metal corrosion inhibitors.

In one embodiment, the acid functional corrosion inhibiting component is added in an amount of from about 0.1% to about 10% by weight of the coolant, preferably from about 1% to about 5%, and more preferably from about 2% to about 4% by weight.

In one exemplary embodiment, the acid functional corrosion inhibiting component of the disclosed coolants will comprise at least 10 or more % by weight of the brazed metal corrosion inhibitors, most preferably the polycarboxylic acid functional compounds as described below, based on the total weight of the acid functional corrosion inhibiting component. In another embodiment, the acid functional corrosion inhibiting component of the disclosed coolants will comprise more than 10 up to 100% by weight of a polycarboxylic acid functional compound as described below, based on the total weight of the acid functional corrosion inhibiting component.

While not wishing to be bound to a particular theory, the presence of the brazed metal corrosion inhibitor comprising a polycarboxylic acid functional compound is believed to be necessary with regards to the leaching of halogen ions, such as fluoride or chloride ions, out of the fluxing agent utilized in brazing processes such as CAB processes.

In one embodiment, the terms 'brazed metal corrosion inhibitor' or 'polycarboxylic acid functional compound' as used herein refer to compounds that have at least three groups selected from the group consisting of anhydride groups, —COOM, and combinations thereof, wherein M is at least one of H, alkali metal ions, alkali earth metal ions, NH4+, amines, imidazoline, polyalcohol esters, C1 to C12 alkyl groups, and combinations thereof, with the proviso that anhydride groups count as two groups.

In one exemplary embodiment, the polycarboxylic acid functional compound will be at least one of a maleated tall oil fatty acid having on average at least three groups selected from the group consisting of anhydride groups, carboxylic acid groups, salts thereof, polyalcohol esters thereof, and combinations thereof; a polymerizable-acid graft polymer; acid functional acrylate-styrene copolymers; and combinations thereof.

Illustrative examples of suitable maleated tall oil fatty acid include the following.

In one embodiment, the brazed metal corrosion inhibitor or polycarboxylic acid functional component has the structure (I):

(I)

wherein $R^1$, $R^2$, $R^3$, and $R^4$ are each independently selected from the group consisting of H, OH, COOH, $C_1$-$C_{10}$ alkyl groups, glycol esters, anhydride groups, —COOM, and combinations thereof, wherein M is at least one of H, alkali metal ions, alkali earth metal ions, NH4+, amines, imidazoline, polyalcohol esters, C1 to C12 alkyl groups, and combinations thereof. In one embodiment, at least three of $R^1$, $R^2$, $R^3$, and $R^4$ contain the group —COOM, wherein M is defined above. In one embodiment, at least two of $R^1$, $R^2$, $R^3$, and $R^4$ contain an anhydride group, and at least one of $R^1$, $R^2$, $R^3$, and $R^4$ contain the group —COOM, wherein M is defined above.

In one exemplary embodiment, $R^3$ is H or COOH. In another embodiment, $R^1$ is a group having a structure $(CH)_x$—(COO)—$[(CH_2)_y$—O$]_z$—H wherein: x is 0 to 10, y is from 1 to 5 and z is from 0 to 5. In another embodiment, $R^4$ is a $C_1$-$C_{10}$ alkyl group. In another embodiment, $R^2$ is COOH. In still another embodiment, $R^2$, and $R^3$ together comprise a single anhydride group.

In one especially exemplary embodiment, the disclosed brazed metal corrosion inhibitor will comprise a polycarboxylic acid functional compound having the structure:

wherein $R^1$, $R^2$, $R^3$, and $R^4$ are each independently selected from the group consisting of H, OH, COOH, $C_1$-$C_{10}$ alkyl groups, glycol esters, anhydride groups, —COOM, and combinations thereof, wherein M is at least one of H, alkali metal ions, alkali earth metal ions, NH4+, amines, imidazoline, polyalcohol esters, C1 to C12 alkyl groups, and combinations thereof; wherein (1) at least three of $R^1$, $R^2$, $R^3$, and $R^4$ contain the group —COOM, wherein M is defined above; or (2) at least two of $R^1$, $R^2$, $R^3$, and $R^4$ contain an anhydride group, and at least one of $R^1$, $R^2$, $R^3$, and $R^4$ contain the group —COOM, wherein M is defined above.

Examples of useful polycarboxylic acid functional compounds include those of formulas (II), (III), (IV) and (V) below:

(II)

(III)

(IV)

(V)

Commercially available examples of the foregoing compounds may be available from Westvaco Corporation.

Other illustrative examples of suitable polycarboxylic acid compound include compounds having the following structures (VI) and (VII):

(VI)

(VII)

where R is a polyalcohol (or combination of polyalcohols) and x+y=12.

The acid-anhydride ester may be further reacted with an amine and/or a metal to form a corrosion inhibiting molecule represented by the following chemical structures (VIII) and (IX):

(VIII)

(IX)

where R is a polyalcohol, x+y 12, and Z and $Z^+$ are members selected from the group consisting of: imidazoline, fatty diamines, metal hydroxides, metal oxides, ammonia, and combinations thereof.

The process which produces these particular brazed metal corrosion inhibitors first follows the teaching of U.S. Pat. No. 4,927,669 by reacting (in a Diels-Alder reaction) one or more $C_{18}$ unsaturated fatty acids with a member selected from the group consisting of maleic anhydride, fumaric acid, and combinations thereof, to produce the known fatty acid Diels-Alder adduct or fatty acid-ene reaction product. However, this adduct or reaction product is further reacted (in a condensation or hydrolyzation reaction) with one or more polyalcohols to form an acid-anhydride partial ester with a low acid number (i.e., from 80 to 265).

This acid-anhydride ester may be reacted (i.e., neutralized) with an amine or amines to form a salt or soap. The resulting salted (or neutralized) ester may be further reacted with a metal hydroxide, a metal oxide, and/or ammonia to additionally salt (or neutralize) the ester. Conversely, the acid-anhydride ester may be reacted with a metal hydroxide, a metal oxide, and/or ammonia to form a salt. The resulting salted ester may be further salted (or neutralized) with an amine (or amines) to additionally salt the ester. Each of these embodiments is an excellent corrosion inhibitor for brazed metal surfaces. Various surfactants may be added to produce an inhibitor formulation tailored to meet the needs of the user. Where necessary, a suitable carrier solvent may be employed to disperse the brazed metal corrosion inhibitor.

The final water-solubility of the brazed metal corrosion inhibiting ester (e.g., whether it is water-dispersible or water-soluble) will depend upon the degree of both the esterification and neutralization (i.e., salting) of the molecule, the amount and character of surfactants added to the formulation, and the amount and character of the carrier solvent utilized. The molecular weight and hydrophilic character of the reacting polyalcohol largely determines the resulting degree of esterification. The corrosion inhibiting ester in the present invention has a range of esterification from 25-75%, with the preferred range being 40-60%.

Although the acid-anhydride ester is an excellent brazed metal corrosion inhibitor, in one embodiment, it is preferred to enhance the degree of corrosion inhibition by neutralizing (i.e., salting) the ester. The degree of neutralization of the ester molecule is determined by the choice of amine (i.e., its hydrophilic/hydrophobic nature), metal, or ammonia derivative used. A preferred corrosion inhibitor is produced by neutralizing from of 50 to 77% by weight of the ester with imidazoline, fatty diamines, or combinations thereof. Additionally, from 1 to 14% by weight of the ester may be reacted with a metal hydroxide, a metal oxide, ammonia, or combination thereof either alone or in conjunction with the amine neutralization.

Other examples of compounds similar to the foregoing maleated tall oil fatty acids useful as the brazed metal corrosion inhibitor include those on the following list of brazed metal corrosion inhibitor structures. It will be appreciated that where carbon atoms© appear to lack a required valency, said carbon is attached to either another similar carbon atom lacking a valency or to an R group, i.e., to denote a cycloaliphatic moiety.

Brazed Metal Corrosion Inhibitor Structures $[R_1-CH(COOM_1)-R_2]_n-[R_3-CH(COOM_2)-R_4]_m-[R_5-CH(COOM_3)-R_6]_l$

$[R_1-C(COOM_1)-R_2]_n-[R_3-C(COOM_2)-R_4]_m-[R_5-C(COOM_3)-R_6]_l$ $[R^1-CH(COOM_1)-CH(COOM_2)-R_2]_n-[R_3-CH(COOM_3)-R_4]_m$ $[R^1-C(COOM_1)-CH(COOM_2)-R_2]_n-[R_3-C(COOM_3)-R_4]_m$ $[R_1-C(COOM_1)-CH(COOM_2)-R_2]_n-[R_3-CH(COOM_3)-R_4]_m$ $[R_1-CH(COOM_1)-CH(COOM_2)-CH(COOM_3)-R_2]_n$

Illustrative examples of suitable polymerizable-acid graft polymers useful as the brazed metal corrosion inhibitor include those comprising from about 1.0% to about 60% by weight of an unsaturated grafting acid and an alkylene oxide polymer, said polymerizable-acid graft polymer having the formula:

The polymerizable-acid graft component useful as the brazed metal corrosion inhibitor comprises an unsaturated grafting acid and an alkylene oxide polymer having the following formula (X):

$$R''-[(OC_nH_{2n})_zOR']_a \qquad (X)$$

wherein each R' is independently selected from the group consisting of a hydrogen atom, hydrogen radicals, and acyl radicals free of aliphatic unsaturation; R'' is selected from the group consisting of a hydrogen atom, hydrogen radicals, amine-containing radicals and acyl radicals; each "n" has, independently, a value of from 2 to 4; each "z" has, independently, a value of from 4 to about 3500 and preferably is from about 8 to about 800; and "a" has a value of from 1 to 4.

Generally, the alkylene oxide the polymers useful in this invention have a number average molecular weight of from about 150 to about 380,000, and more preferably from 400 to about 10,000.

The preferred class of alkylene oxide polymers have the formula (XI):

wherein R is selected from the group consisting of a hydrogen atom, hydrogen radicals, amine-containing radials and acyl radicals; each R' is independently selected from the group consisting of —H, —CH$_3$ and —C$_2$H$_5$, resulting, respectively, in an ethylene oxide ("EO"), propylene oxide ("PO") or butylene oxide ("BO") polymer; and "z" has a value of from 4 to about 3500 and preferably is from about 8 to about 800.

More preferred alkylene oxide polymers include copolymers of EO and PO polymers where the weight ratio of EO:PO can be from about 1:100 to about 100:1, preferably from about 1:20 to about 20:1, and more preferably from about 1:3 to about 3:1. Such alkylene oxide polymers are readily available (e.g., Union Carbide's UCON®, Dow's, BASF's and Olin's polyalkylene glycols) or readily made (see, e.g., U.S. Pat. Nos. 4,146,488; 4,392,972 and 4,404,114).

The grafting acid may be any unsaturated, polymerizable-acid and selected from the group consisting of acrylic, methacrylic, crotonic, maleic, vinylsulfonic and vinyl phosphoric acids. The term "polymerizable-acid" refers to hydrolysable precursors such as acrylonitrile, ethyl acrylate, methylmethacrylate, ethyl maleate, bis-(2-chloroethyl) vinylphosphonate, bis-(2-chloroethyl)vinylsulfonate or mixtures thereof and the like. Preferred grafting adds include acrylic, methacrylic, crotonic and maleic acids, more preferably acrylic and maleic acids, and most preferably acrylic acid.

The grafting of the polymerizable-acid onto the alkylene oxide polymer can be carried out by free radical polymerization as is known in the art (see, e.g., U.S. Pat. Nos. 4,146,488, 4,392,972, 4,404,114 and 4,528,334) such that the amount of grafting acid in the grafted polymer is up about 60% (by weight). Preferably the grafting acid content is from about 1.0% to, about 30%, more preferably from about 1% to about 20%, and even more preferably from about 3% to about 15%. While even very small amounts of grafting acid are expected to provide CE-type corrosion inhibition to the corrosion inhibitor composition used in this invention, the use of a grafted polymer having more than about 60% grafting acid content may result in a polymer having an unduly high viscosity.

The polymerizable-acid grafted polymers useful in the present invention are preferably partially or wholly neutralized with a base to result in the salt form of the grafted polymer. It is preferred that the acid graft polymers be wholly neutralized. The base used to partially or wholly neutralize the grafted polymer may be any commercially available base including ammonium hydroxide, alkali metal or alkaline earth metal hydroxides, and amines including amines having the formula (XII):

(XII)

wherein each R is, independently, H or an alkyl group having 1 to 6 carbon atoms; each of $R_1$, $R_2$ and $R_3$ is independently selected from the group consisting of alkylene radicals having 2 to 4 carbon atoms; "e" has a value of from 0 to 3, each of "b," "c" and "d" is independently 0 or 1, with the proviso that when "b," "c" and "d" are 1, then "e" is 0.

An illustrative example of a suitable acid functional acrylate-styrene copolymer is an acid functional acrylate styrene copolymer having a molecular weight of about 3000 is Alcosperse™ 725, commercially available from Alco Chemical of Chattanooga, Tenn.

The disclosed coolants will, in one embodiment, further comprise one or more freezing point depressants and water.

In another embodiment, the disclosed coolants will comprise a freezing point-depressing agent in range of about 10% to 99% by weight; water; brazed metal corrosion inhibitors as disclosed herein; traditional corrosion inhibitors as described below; antifoam agents; other coolant additives, such as one or more of colorants, dispersants, antiscalants, wetting agents, biocides, pH adjusting agents, buffering agents and the like, as well as combinations of such additives. In one embodiment, such coolants will be especially suitable for use in non-fuel cell applications. In one embodiment, the optional additives for use in the coolant should be non-conductive or have a very low electrical conductivity.

Suitable freezing point depressants includes alcohol or a mixture of alcohols, such as monohydric or polyhydric alcohols and mixtures thereof. For example, in one embodiment, suitable alcohols are selected from the group consisting of methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, alkoxy alkanols such as methoxyethanol and mixtures comprising one or more of the foregoing.

In one embodiment, a suitable freezing point depressant will be present in the disclosed coolant compositions in an amount of about 10% to about 99.9% (by weight of the total coolant composition), while in another embodiment alcohol will be present in an amount of from about 30% to 99.5%. In one especially exemplary embodiment, a suitable alcohol will be present in an amount of about 40% to about 99% by weight of the total composition.

Water suitable for use in the disclosed coolants includes deionized water, softened water, or drinking water. The water is present in the coolant compositions in an amount of about 0.1% to about 90% by weight, and preferably, about 0.5% to 70%. In one exemplary embodiment, water is present in the disclosed coolants in an amount of about 1% to about 60% by weight, based on the total weight of the coolant composition.

In one embodiment, the disclosed brazed metal corrosion inhibitor will be combined with one or more of the "traditional" corrosion inhibitors commonly used in an organic acid coolant or a hybrid coolant. It will be appreciated that such 'traditional' corrosion inhibitors may be part of the acid functional corrosion inhibitors described above. The combination of the brazed metal corrosion inhibitors and traditional corrosion inhibitors are especially suitable for use in coolants intended for use in non-fuel cell vehicle cooling systems. However, it will be appreciated that they are likewise suitable for use in fuel cell applications.

The 'traditional' coolant corrosion inhibitors that can be used in the instant invention include corrosion inhibitors for copper and copper alloys. The suitable copper and copper corrosion inhibitors include the compounds containing 5- or 6-member heterocyclic ring as the active functional group, wherein the heterocyclic ring contains at least one nitrogen atom, for example, an azole compound.

Particularly suitable are one or more of benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole and substituted tetrazoles, and mixtures thereof can be used as Cu and Cu alloy corrosion inhibitors.

In one embodiment, these traditional corrosion inhibitors for copper and copper alloys are present in the disclosed coolant compositions in an amount of from about 0 to about 7% by weight, more particularly about 0.01 to 4% by weight, based on the total weight of the coolant.

Also suitable as traditional corrosion inhibitors are those corrosion inhibitors that inhibit corrosion of aluminum and ferrous metals.

Illustrative examples of these 'traditional' corrosion inhibitors include one or more of silicates, carboxylates, phosphates, borates, molybdates, nitrates, nitrites or the alkali metal, alkaline earth metal, ammonium or amine salts thereof.

Suitable carboxylates include saturated and unsaturated aliphatic, and aromatic mono-, di- and tricarboyxlic acids, and salts and isomers thereof, and any mixture thereof. Particularly suitable carboxylates include $C_4$ to $C_{12}$ mono-, or di-carboxylic acids, such as 2-ethyl hexanoic acid, neodecanoic acid, benzoic acid, t-butylbenzoic acid, dodecanediodic acid and sebacic acid, or alkali and alkali earth metal, ammonium and amine salts, or isomers and mixtures thereof.

The aluminum and ferrous metal corrosion inhibitors may be present in the coolant in of from about 0 to about 7% by weight, more particularly in an amount of about 0.05 to about 6% by weight, all based on the total weight of the coolant composition.

By adding the disclosed brazed metal corrosion inhibitors compound to a coolant in a vehicle cooling system containing at least one brazed metal surface, corrosion protection of metallic components in the system is improved substantially. Leaching of halogen ions, especially fluoride ions, from any residual brazing flux agent present on the brazed metal surfaces present in the vehicle cooling is substantially reduced. Thus, in one embodiment, the disclosed brazed metal corrosion inhibitors and coolants comprising the same are believed to inhibit and/or prevent the formation and action of corrosion on metal components joined by brazing processes, i.e., 'brazed metal surfaces or components', especially brazed aluminum surfaces. However, these brazed metal corrosion inhibitors and coolants comprising the same are also believed to provide other beneficial effects.

For example, as show in the attached examples, it is believed that the use of the disclosed brazed metal corrosion inhibitors in coolants acts to prevent the leaching or solubilization of halogen ions into the coolant. Halogen ions such as fluoride and chloride ions are believed to be present in the fluxing agents used in brazing processes. The presence of halogen ions in the coolant is known to contribute to the formation of corrosion and undesirable effects upon metal surfaces in communication with such halogen ion containing coolants.

Alternatively, or in addition, the use of the disclosed brazed metal corrosion inhibitors in coolants is believed to result in the production of reaction products that block the formation of corrosion on brazed metal surfaces. For example, as shown in the attached examples, the disclosed coolants provide a protective effect that continues even after the disclosed coolants are removed and replaced with coolants lacking the disclosed brazed metal corrosion inhibitors. While not wishing to be bound to a particular theory, it is believed that the brazed metal corrosion inhibitors react with the halogen ions to form reaction products that block or inhibit the formation of corrosion upon the normally vulnerable brazed metal surface.

For fuel cell powered vehicles, the disclosed coolants may be used in cooling systems comprising at two isolated loops. One loop is used to cool the fuel cell stack. The second loop is used to cool rest of the vehicle systems requiring cooling. The two loops are isolated and in thermal communication via the use of a heat exchanger made of stainless steel or other suitable material. In one embodiment, two different coolants may be used the two different loops. In one embodiment, brazed metal surfaces will not be present in the heat exchangers of the coolant loop used to cool the fuel cell stack. It will be appreciated that the coolants described above for non-fuel cell vehicle cooling systems can be used in the non-fuel-cell-stack coolant loop.

In one embodiment, for the fuel cell stack coolant, an ion exchange resin pre-saturated with a desirable corrosion inhibitor composition intended to provide the required corrosion protection.

Particularly, ion exchange resins (e.g., mixed bed resins or anion exchange resins) are first pre-treated with a corrosion inhibitor containing 5- or 6-member heterocyclic ring as the active functional group, wherein the heterocyclic ring contains at least one nitrogen atom, for example, an azole compound. Then, the ion exchange resins are packaged into a filter installed in a side-stream of the fuel cell stack cooling loop. Some of the ionic species present in the fuel cell coolant or being generated during fuel cell operation will exchange with the corrosion inhibitor attached to the exchangeable sites on the ion exchange resins. This leads to the release of the corrosion inhibitor from the resin and removal of the ionic species from the coolant. Since 5- or 6-member N-heterocyclic compounds used as corrosion inhibitors are weakly ionic compounds, the release of them at the typical use concentration ranges, e.g., less than a few thousand milligrams per liter in the coolant will not result in an unacceptable increase in conductivity. One advantage of the instant invention is that the amount of inhibitor release from the resin depends on the corrosion protection need of the coolant. An increase in corrosivity in the coolant will produce more ionic species, which in turn will trigger an increase in the amount of the corrosion inhibitor from the resin due to the ion exchange mechanism. The increased corrosion inhibitor concentration in the coolant will lead to a reduction in corrosion rate. Another advantage of the disclosed systems is that the presence of mixed bed ion exchange resins will maintain low conductivity in the fuel cell coolants in the loop. In addition, filter and/or strainer may be also be included in the disclosed cooling systems to prevent the leakage of ion exchange resin beads into the fuel cell stack cooling loop.

Ion exchange resins loaded with corrosion inhibitors can be prepared by contacting the ion exchange resins with aqueous solutions containing the corrosion inhibitors for a sufficient long contact time period so that the corrosion inhibitors have exchanged 15% or more of the total exchangeable groups in the resins. In another words, the corrosion inhibitor loading should reach 15% or more of the exchange capacity of the resin. Preferably, the corrosion inhibitor loading should be more than 50% of the exchange capacity of the resins. More preferably, the corrosion inhibitor loading should be more than 75% of the exchange capacity of the resin. The ion exchange resins loaded with corrosion inhibitors are then packaged into a filter and placed in the fuel cell cooling system to provide the desired corrosion protection. Before installing in the cooling system, the ion exchange resins loaded with corrosion inhibitors may be cleaned with de-ionized water and/or cleaned fuel cell coolant to minimize the possibility of accidental introduction of impurities into the system.

The corrosion inhibitors that can be used in the instant invention include the compounds containing 5- or 6-member heterocyclic ring as the active functional group, wherein the heterocyclic ring contains at least one nitrogen atom, for example, an azole compound. Particularly, benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole and substituted tetrazoles, and mixtures thereof can be used as corrosion inhibitors. Other corrosion inhibitors, such as colloidal silica, siloxanes, carboxylates, carboxylate esters, amines, etc. can also be used.

The ion exchange resins used in the instant invention depend on the nature of the corrosion inhibitors to be used. If N-heterocyclic compounds are used as the corrosion inhibitors, the ion exchange resin should be regenerable mixed-bed resins or anion exchange resins. If the corrosion inhibitors may become positively charged species in solutions, then regenerable mixed bed resins or cation exchange resins can be used. The mixed bed resin used is a mixture of a cation ion exchange resin and an anion exchange resin. The cation exchange resin used in the instant invention should be in $H^+$ form and the anion exchange resin should be in $OH^-$ form. An ion exchange resin consists of the polymer matrix and the functional groups that interact with the ions. The ion exchanger matrix may be polystyrene, including polystyrene and styrene copolymers, polyacrylic, phenol-formaldehyde, and polyalkylamine. The cation ion exchange resin functional groups may be sulfonic acid groups ($-SO_3H$), phosphonic acid groups ($-PO_3H$), phosphinic acid groups ($-PO_2H$), or carboxylic acid groups ($-COOH$ or $-C(CH_3)-COOH$). The anion ion exchange resin functional groups may be quaternary ammonium groups, e.g., benzyltrimethylammonium groups or benzyldimethylethanolammonium groups; or tertiary amine functional groups. Generally, the ion exchange resins produced by Rohm and Haas (e.g., Amberlite, Amberjet and Duolite, Imac resins), Bayer (Lewatit), Dow (Dowex), Mitsubishi (Diaion), Purolite, Sybron (Ionac), Resintech and others can be used in the instant invention.

The fuel cell stack coolant proposed in the instant invention comprises (1) an alcohol or mixture of alcohols; (2) corrosion inhibitors containing a siloxane based compound or mixture and/or colloidal silica, and azole compound; (3) deionized water; (4) an effective antifoam; and (5) other optional coolant additives, such as non-conducting colorants, wetting agents, and biocides, etc.

Suitable alcohols include monohydric or polyhydric alcohols and mixture thereof. The alcohol is selected from the group consisting of methanol, ethanol, propanol, butanol, furfurol, furfuryl alcohol, tetrahydrofurfuryl alcohol, ethoxylated furfuryl alcohol, ethylene glycol, diethylene glycol, triethylene glycol, 1,2-propylene glycol, 1,3-propylene glycol, dipropylene glycol, butylene glycol, glycerol, glycerol-1,2-dimethyl ether, glycerol-1,3-dimethyl ether, monoethylether of glycerol, sorbitol, 1,2,6-hexanetriol, trimethylopropane, alkoxy alkanols such as methoxyethanol and mixture thereof. The alcohol is present in the composition in an amount of about 10% to about 90% (by weight), and preferably, about 30% to 70%. More preferably, the alcohol is present in an amount of about 40% to 60% by weight.

Suitable siloxane based compounds include Silwet siloxane surfactants from GE Silicones/OSi Specialties, such as Silwet L-77, Silwet L-7657, Silwet L-7650 and Silwet L-7600, as well other Silwet surfactants or other similar siloxane-polyether copolymers available from Dow Corning or other suppliers. Other suitable siloxane compounds include non-conductive or nearly non-conductive organosilane-based compounds comprising one or more silicon-carbon bonds [i.e., compounds that are capable of hydrolyzing in the presence of water to form silanols (i.e., compounds with one or more Si—OH groups)], such as alkoxysilanes, e.g., Formasil 891, Formasil 593, Formasil 433, Silquest®Y-5560 silane (i.e., polyalkyleneoxidealkoxysilane), Silquest® A-186 [2-(3,4-epoxycyclohexyl)ethyltrimethoxysilane], Silquest® A-187 (3-glycidoxypropyltrimethoxysilane), 3-aminopropyltriethoxysilane, N-2-(aminoethyl)-3-aminopropyltrimethoxysilane, octyltriethoxysilane, vinyltriethoxylsilane, vinyltrimethoxylsilane, methyltriethoxysilane, 3-methacryloxypropyltrimethoxysilane, 3-mercaptopropyltrimethoxysilane, isobutyltrimethoxysilane, phenyltrimethoxysilane, methyltrimethoxysilane, or other Silquest surfactants available from GE Silicones/Osi Specialties or other suppliers. The siloxane based compounds and mixture thereof are present in the formulation in an amount of from about 0.01% to about 10% by weight, and preferably, about 0.02% to about 2% by weight.

The colloidal silica for use as corrosion inhibitor in the fuel cell stack coolants has a nominal particle size between about 1 nm (or nanometer) to about 200 nm. Preferably, the colloidal silica particle size is between about 1 nm to about 100 nm. More preferably, the colloidal silica particle diameter is between about 1 nm to about 40 nm. The suitable colloidal silica include Ludox colloidal silica from DuPont or Grace Davidson, Nyacol and/or Bindzil colloidal silica from Akzo Nobel—Eka Chemicals, Snowtex colloidal silica from Nissan Chemical, as well as colloidal silica from Nalco and other suppliers. Another benefit of using colloidal silica in the coolant is that they are nano-particles and hence, they may increase heat transfer efficiency and/or heat capacity of the coolants. The colloidal silica is present in the formulation in an amount of no more than about 10,000 ppm, and preferably, less than about 2000 ppm.

The suitable azole compounds include benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms). In addition, imidazoles and substituted imidazoles, tetrazole and substituted tetrazoles can also be used. The azole compound or mixture is present in the formulation in an amount of from about 1 ppm to about 2000 ppm, and preferably, about 10 ppm to about 500 ppm.

A number of non-conductive polydimethylsiloxane emulsion based antifoams can be used in the instant invention. They include PC-5450NF from Performance Chemicals, LLC in Boscawen, N.H.; CNC antifoam XD-55 NF and XD-56 from CNC International in Woonsocket in R.I.

Optionally, a tetraalkylorthosilicate ester with the alkyl groups containing 1 to 20 carbon atoms (e.g., tetramethylorthosilicate, tetraethylorthosilicate, and the like) can also be included. The tetralkylorthosilicate ester is present in the formulation in an amount of 0% to about 5% by weight.

Finally, the disclosed brazed metal corrosion inhibitors may be used in the ion exchange resins.

EXAMPLES

Experimental data showing the benefits of using the instant invention are described in the example below.

Table 1 shows the results of solution analysis of fluoride concentrations in various coolant formulations after exposing to a Nocolok flux brazed aluminum sample and after conducting anodic polarization curve measurements on the sample while immersing in the coolants.

TABLE 1

Fluoride Concentration After Electrochemical Tests on Brazed Aluminum Sample with Nocolok flux, 1 time flux loading at 20-25% concentration.

| Coolant ID | Fluoride (mg/L) | Observation |
|---|---|---|
| Coolant Composition 1 | 56 | 90% surface area were attacked |
| Coolant Composition 2 | 0 | Surface (AA3003) showed minimal attack |

TABLE 1-continued

Fluoride Concentration After Electrochemical Tests on Brazed Aluminum Sample with Nocolok flux, 1 time flux loading at 20-25% concentration.

| Coolant ID | Fluoride (mg/L) | Observation |
| --- | --- | --- |
| Coolant Composition 3 | 7 | Surface showed very minor attack |
| Coolant Composition 4 | 16 | Surface showed minor attack, particularly under o-ring crevice |
| Coolant Composition 5 | <5 | Surface showed no noticeable attack |
| Coolant Composition 6 | 113 | Surface attacked intensively |
| Coolant Composition 7 | 26 | Surface showed isolated localized attack |

Coolant Composition 1 comprises 25% of a monocarboxylate acid based coolant and 100 ppm chloride ions.

Coolant Composition 2 comprises 25% of a monocarboxylate acid based coolant and 100 ppm chloride ions.

Coolant Composition 3 comprises 25 weight % of a monocarboxylate acid based coolant, 100 ppm chloride ions, and 0.1 weight % OCD-447.

Coolant Composition 4 comprises 25 weight % of a monocarboxylate acid based coolant, 100 ppm chloride ions, and 0.3 weight % OCD-447.

Coolant Composition 5 comprises 25 weight % of a monocarboxylate acid based coolant, 100 ppm chloride ions, and 0.3 weight % OCD-448.

Coolant Composition 6 comprises 25% of a low silicate/carboxylate acid hybrid coolant and 100 ppm chloride ions.

Coolant Composition 7 comprises 25% of a conventional high silicate based coolant and 100 ppm chloride ions.

OCD-448 and OCD-447 are respectively a maleated tall oil fatty acid, ethylene glycol ester, potassium salt, and a maleated tall oil fatty acid, diethylene glycol ester, potassium, commercially available from MeadWestvaco of Charleston, S.C.

The results in Table 1 show that while coolants containing organic acids, low silicate hybrid and conventional high silicate based corrosion inhibitor formulations can provide excellent corrosion protection for aluminum alloys in vehicle operation conditions, their corrosion protection for brazed aluminum containing fluoride based flux have substantial room for improvement. Under the test conditions, the low silicate hybrid coolant yielded the worse corrosion protection results. Addition of a small amount (e.g., 0.1-0.3% by weight) of tall oil fatty acid derived compounds to an organic acid based coolant resulted in substantial improvement in corrosion protection of brazed aluminum containing flux residual. OCD-448 (or WS-5520) appeared to yield better results than OCD-447 under the same dosage conditions. The anodic polarization curve results obtained by us (see the FIGURE) show similar results as shown in Table 1. It should be noted that the results shown in the FIGURE indicate that OCD-447 appeared to yield better corrosion protection for the brazed aluminum than OCD-448 under comparable conditions. Furthermore, electrochemical measurements on sand-cast aluminum also show that increasing fluoride concentration in coolants generally lead an increase in corrosion in aluminum parts not covered with brazed residuals, e.g., engine block. The effect increases with increasing fluoride concentration.

Table 2 shows the results of solution analysis of fluoride concentrations and brazed aluminum sample mass loss results under a different set of test conditions. Essentially the same results as in Table 1 are obtained. Mono-carboxylic acids and sebacic acid based coolants yield similar corrosion protection results for brazed aluminum. The brazed aluminum corrosion protection performance can be increased substantially when a small amount (i.e., 0.3% by weight) of reaction products of maleated tall oil fatty acids, diethylene glycol ester and their salts (i.e., WS-5520 or OCD-448) was added into an organic acid based coolant. In addition, adding a small amount (0.4% by weight) of an acrylate-styrene copolymer (i.e., Alcosperse 725) to an organic acid based coolant also reduced the amount of fluoride ion released from the sample during the test, indicating its beneficial effect in reducing brazed aluminum corrosion under the test conditions.

TABLE 2

Mass Loss and Fluoride Concentration Results for Brazed Aluminum in Various Coolants.

| Coolant ID | Fluoride (mg/L) | Mass Loss (mg) |
| --- | --- | --- |
| Coolant Composition 8 | 37 | 5.9 |
| Coolant Composition 9 | 71 | 6.4 |
| Coolant Composition 10 | 3 | 0.8 |
| Coolant Composition 11 | 52 | 7.6 |
| Coolant Composition 12 | 47 | 4.9 |

Coolant Composition 8 comprises 50% of a monocarboylate acid based coolant.

Coolant Composition 9 comprises 50% of a monocarboxylate acid based coolant and 100 ppm chloride ions.

Coolant Composition 10 comprises 50% of a monocarboylate acid based coolant.

Coolant Composition 11 comprises 50% of a monocarboxylate acid based coolant and 100 ppm chloride ions.

Coolant Composition 12 comprises 50% of a Texaco Dex-Cool coolant (comprising sebacic acid and 2ethyl hexanoic acid) and 100 ppm chloride ions.

The FIGURE shows the amount the conductance of various coolant compositions:

Coolant composition 21 comprises an organic acid based coolant.

Coolant composition 22 comprises an organic acid based coolant and 0.3% OCD-447.

Coolant composition 23 comprises an organic acid based coolant and 0.3% OCD-448.

Coolant composition 24 comprises a conventional high silicate based coolant.

Coolant composition 25 comprises a low silicate organic acid hybrid coolant.

As shown in the FIGURE, adding an acid functional corrosion inhibiting components, as in coolant composition 22 and coolant composition 23, does not increase the electrical conductance of the solution. The FIGURE is for 25% by volume coolant, 100 ppm Cl with tests conducted after boiling for 1 hour and at 60±5 degrees C.

The invention claimed is:

1. A method for inhibiting corrosion resulting from residual brazing flux remaining on a brazed metal surface in a cooling system, the method comprising:
   contacting said brazed metal surface with a coolant consisting of:
   a) a polycarboxylic acid functional compound having the structure:

wherein $R^1$, $R^2$, $R^3$, and $R^4$ are each independently selected from the group consisting of H, OH, COOH, $C_1$-$C_{10}$ alkyl groups, glycol esters, anhydride groups, —COOM, and combinations thereof, wherein M is at least one of alkali metal ions, alkali earth metal ions, $NH_4^+$, amines, imidazoline, polyalcohol esters, $C_1$ to $C_{12}$ alkyl groups, and combinations thereof; with the proviso that at least two of $R^1$, $R^2$, $R^3$, and $R^4$ contain an anhydride group, and at least one of $R^1$, $R^2$, $R^3$, and $R^4$ contain the group —COOM, wherein M is defined above;

b) an azole compound;
c) an aliphatic or aromatic, mono- or dicarboxylic acid, or salts, isomers, or mixtures thereof;
d) a freezing point depressant; and
e) optionally, an additive selected from the group consisting of water, antifoam agents, colorants, dispersants, antiscalants, wetting agents, biocides, pH adjusting agents, buffering agents, and a combination thereof;

wherein the coolant lacks nitrate.

2. The method of claim 1, wherein the polycarboxylic acid functional compound comprises a tall oil fatty acid derived from a cyclohexenoic acid containing compound.

3. The method of claim 2, wherein the cyclohexenoic acid containing compound comprises a maleated tall oil fatty acid, a maleated tall oil fatty acid salt, a reaction product derived from a maleated tall oil fatty acid, a reaction product derived from a maleated tall oil fatty acid salt, a reaction product derived from a ethylene glycol ester, a reaction product derived from a ethylene glycol ester salt, or a maleated tall oil.

4. The method of claim 1, wherein the polycarboxylic acid functional compound comprises a maleinized unsaturated fatty acid, an acrylate copolymer, a styrene copolymer, or a polymerizable acid graft polymer.

5. The method of claim 1, wherein $R^1$ is a group having a structure $(CH)_x$—$(COO)$—$[(CH_2)_y$—$O]_z$—H wherein: x is 0 to 10, y is from 1 to 5 and z is from 0 to 5.

6. The method of claim 1 wherein $R^4$ is a $C_1$-$C_{10}$ alkyl group.

7. The method of claim 1, wherein $R^2$ and $R^3$ comprise an anhydride group.

8. The method of claim 1 wherein the brazed aluminum surface comprises residual flux agent.

9. The method of claim 8 wherein the residual flux agent comprises halogen atoms.

10. The method of claim 9 wherein the halogen atoms are fluorine atoms.

11. The method of claim 8 wherein the residual flux agent comprises an alkaline metal halogen compound or an alkaline earth metal halogen compound.

12. The method of claim 11 wherein the residual flux agent comprises a mixture of $K_3AlF_5$, $K_2AlF_5$ and $KAlF_4$.

13. The method of claim 1, wherein the azole compound is one or more of an alkyl benzotriazole, a thiazole, an imidazole, a tetrazole, or an indazole.

14. The method of claim 1, wherein the azole compound is one or more of a tolyltriazole, methyl benzotriazole, butyl benzotriazole, or mercaptobenzotriazole.

15. The method of claim 1, wherein the mono- or dicarboxylic acid is a $C_4$ to $C_{12}$ mono- or dicarboxylic acid.

16. The method of claim 1, wherein the $C_4$ to $C_{12}$ mono- or dicaraboxylic acid is selected from the group consisting of 2-ethyl hexanoic acid, neodecanoic acid, benzoic acid, t-butylbenzoic acid, dodecandediodic acid, sebacic acid, salts thereof, isomers thereof, and mixtures thereof.

17. The method of claim 1, wherein the carboxylic acid is a saturated aliphatic dicarboxylic acid.

* * * * *